US008606212B2

(12) United States Patent
Sheikholeslami

(10) Patent No.: US 8,606,212 B2
(45) Date of Patent: Dec. 10, 2013

| | | | | | |
|---|---|---|---|---|---|
| (54) | NEAR FIELD COMMUNICATIONS RECEIVER | | 8,351,850 B2 * | 1/2013 | Van Aken et al. ............... 455/24 |
| | | | 2003/0054788 A1 * | 3/2003 | Sugar et al. .................... 455/323 |
| | | | 2006/0098765 A1 * | 5/2006 | Thomas et al. ................ 375/346 |

(75) Inventor: Behzad Sheikholeslami, Cambridge (GB)

(73) Assignee: Cambridge Silicon Radio Limited, Cambridge, Cambridgeshire (GB)

( * ) Notice: Subject to any disclaimer, the term of this patent is extended or adjusted under 35 U.S.C. 154(b) by 0 days.

(21) Appl. No.: 13/523,640

(22) Filed: Jun. 14, 2012

(65) Prior Publication Data

US 2012/0322399 A1 Dec. 20, 2012

(30) Foreign Application Priority Data

Jun. 16, 2011 (GB) .................................. 1110190.4

(51) Int. Cl.
*H04B 1/16* (2006.01)

(52) U.S. Cl.
USPC ........................... 455/334; 455/41.2; 375/326

(58) Field of Classification Search
USPC ............... 455/41.1–41.3, 254, 318, 334, 337,
455/323, 296; 375/326, 147, 148, 152, 350;
340/10.1
See application file for complete search history.

(56) References Cited

U.S. PATENT DOCUMENTS

| 7,526,266 B2 * | 4/2009 | Al-Mahdawi ................. 455/296 |
|---|---|---|
| 8,233,872 B2 * | 7/2012 | Nagai et al. .................... 455/296 |
| 8,285,214 B2 * | 10/2012 | Sadeghfam et al. ......... 455/41.3 |

FOREIGN PATENT DOCUMENTS

| GB | 2428940 A | 2/2007 |
|---|---|---|
| WO | WO 2006/088583 A2 | 8/2006 |

OTHER PUBLICATIONS

United Kingdom Intellectual Property Office Search Report for Application No. GB1110190.4 dated Oct. 5, 2012.
United Kingdom Intellectual Property Office Combined Search and Examination Report for Application No. GB1110190.4 dated Oct. 8, 2012.

\* cited by examiner

*Primary Examiner* — Christian Hannon
(74) *Attorney, Agent, or Firm* — K&L Gates LLP

(57) ABSTRACT

The present application relates to a near field communications (NFC) receiver in which a received NFC signal comprising a carrier signal onto which a data signal is modulated is digitised and downconverted, and the digitised and downconverted received signal is filtered to recover a digitised and downconverted version of the carrier signal of the NFC signal. This digitised and downconverted version of the carrier signal is converted into an analogue signal which is then upconverted to generate an estimate of the carrier signal, and this estimate is combined with the received NFC signal to suppress or negate, at least partially, the carrier of the received signal.

18 Claims, 1 Drawing Sheet

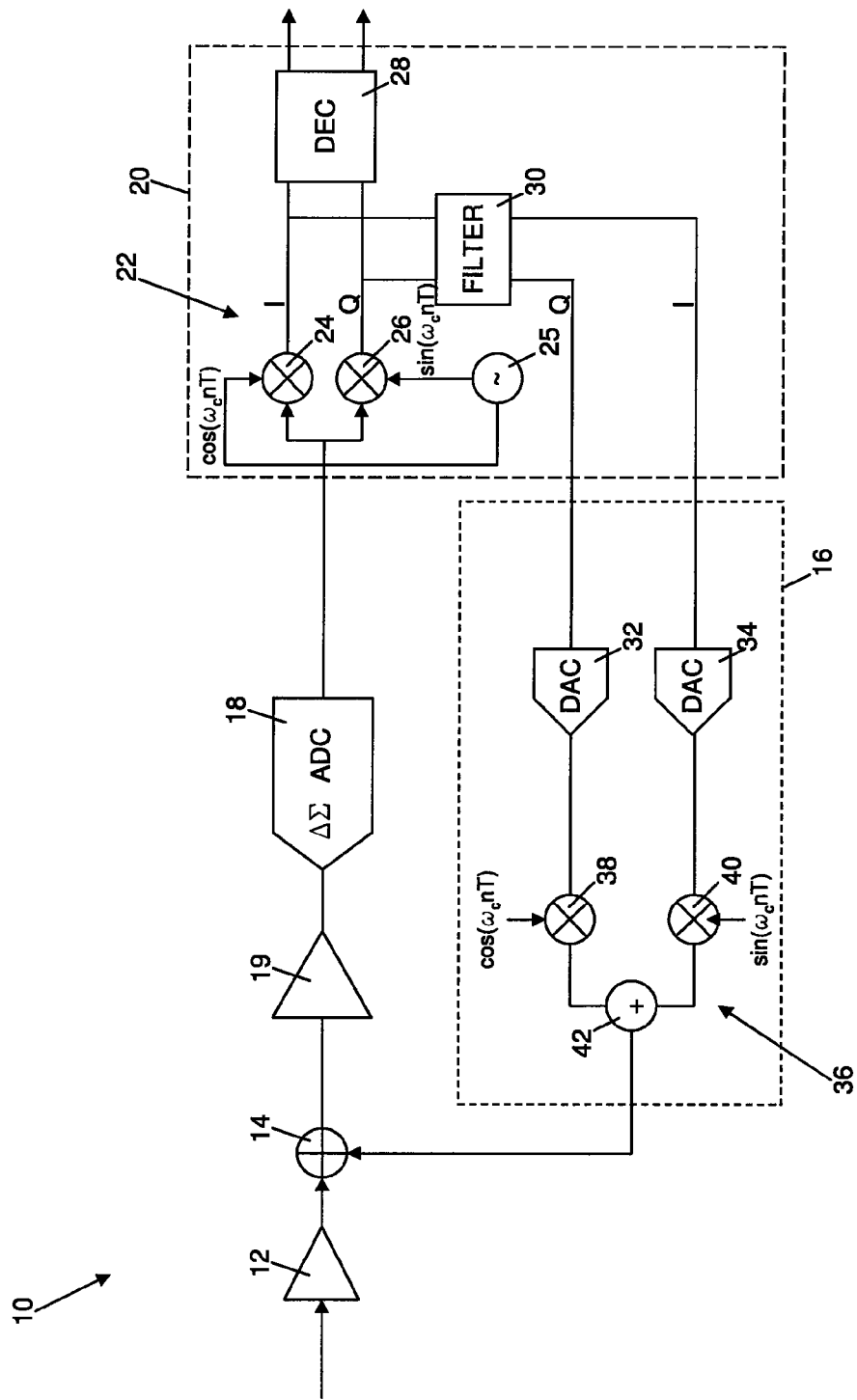

NEAR FIELD COMMUNICATIONS RECEIVER

CROSS REFERENCE TO RELATED APPLICATION

This application claims priority under 35 U.S.C. §119 of United Kingdom Application No. GB1110190.4, titled "A NEAR FIELD COMMUNICATIONS RECEIVER," filed Jun. 16, 2011, and incorporated herein by reference in its entirety.

TECHNICAL FIELD

The present application relates to a near field communications (NFC) receiver.

BACKGROUND TO THE INVENTION

Near field communications (NFC) devices are becoming increasingly popular in sectors such as banking, as they permit rapid exchange of data over a short range (less than 10 cm), which can be used to facilitate making small value payments, for example.

NFC devices such as readers and tags transmit data by modulating a carrier having a frequency of around 13.56 MHz with a signal carrying the data to be transmitted. The modulated signal is received by a compatible NFC device such as a tag or reader having a receiver which demodulates the received signal to recover the transmitted data.

A problem with NFC communications is that the carrier in the signal received by an NFC device typically has a much greater amplitude than the data signal. This means that the NFC receiver must have a large dynamic range in order to have a high enough signal to noise ratio to permit successful demodulation of the received signal. For the same reason a clock of the receiver which provides a clock signal for demodulating the received signal must have very low phase noise. Such clocks are typically very complex, require a large area of silicon (in IC implementations), and have high current consumption.

SUMMARY OF INVENTION

The present application relates to a near field communications (NFC) receiver in which a received NFC signal comprising a carrier signal onto which a data signal is modulated is digitised and downconverted, and the digitised and downconverted received signal is filtered to recover a digitised and downconverted version of the carrier signal of the NFC signal. This digitised and downconverted version of the carrier signal is converted into an analogue signal which is then upconverted to generate an estimate of the carrier signal, and this estimate is combined with the received NFC signal to suppress or negate, at least partially, the carrier of the received signal.

According to a first aspect of the invention there is provided a near field communications (NFC) receiver, the receiver comprising: an analogue to digital converter (ADC) for digitising a received NFC signal comprising a carrier modulated with an information signal; a downconverter for downconverting the digitised signal; a filter for filtering the downconverted signal to recover a digitised and downconverted version of the carrier; a digital to analogue converter (DAC) for converting the digitised and downconverted version of the carrier into an analogue signal; an upconverter for generating, from the analogue signal generated by the DAC, an estimate of the carrier of the received NFC signal; and a combiner for combining the analogue signal so produced with the received NFC signal.

The receiver suppresses the carrier in a received NFC signal, and thus the proportion of the wanted data signal in the signal output to a subsequent demodulation stage (i.e. the signal to noise ratio) is higher than in known receivers, which means that the dynamic range of the demodulation stage can be reduced in comparison to known systems, which in turn facilitates the design of the demodulation stage. Additionally, this receiver architecture does not require a low phase noise clock.

The ADC may comprise a delta-sigma ADC.

The ADC may be configured to have a sampling frequency which is four times the frequency of the carrier of the received NFC signal.

Delta-sigma ADCs of this type have properties that make them particularly suitable for use in the receiver. For example, the use of a delta-sigma ADC configured to have a sampling frequency that is four times the carrier frequency of the received NFC signal simplifies the design and implementation of the downconverter.

The NFC receiver may further comprise a signal generator for generating a local signal for use in the downconverter.

The signal generator may be configured to generate a square wave signal. This simplifies the design and implementation of the signal generator, as square waves can be generated easily, particularly in digital systems.

The ADC may be configured to have zeros in its frequency response at odd integer multiples of the carrier of the received NFC signal.

The use of an ADC configured in this way further simplifies the design of the receiver, since it obviates the need for low-pass filters at the input to the ADC, as any components in the signal output by the combiner (to the ADC) that are due to harmonics resulting from the use of a square wave in generating the estimate of the carrier are automatically attenuated by the ADC. This also simplifies the specification of a digital low pass filter used to recover a digitised version of the carrier signal, as this filter does not have to filter high frequency signal and noise components which would otherwise be input to the ADC and would fold back or alias into the signal band.

The downconverter may be configured to downconvert the digitised signal to DC.

The upconverter may be configured to generate an estimate having a frequency equal to that of the carrier of the received NFC signal.

The upconverter may be configured to use the signal generated by the local signal generator.

This further simplifies the design and implementation of the receiver, as only one local signal generator is required. Additionally, timing errors are minimised by the use of a common local signal generator for the upconverter and the downconverter.

According to a second aspect of the invention there is provided a method of suppressing a carrier in a near field communications (NFC) signal, the method comprising: receiving an NFC signal comprising a carrier modulated with an information signal; digitising the received NFC signal; downconverting the digitised signal; filtering the downconverted signal to recover a digitised and downconverted version of the carrier; converting the digitised and downconverted version of the carrier into an analogue signal; generating, from the analogue signal generated by the DAC, an estimate of the carrier of the received NFC signal; and combining the estimate with the received NFC signal.

Digitising the received signal may be performed by a delta-sigma ADC.

The ADC may be configured to have a sampling frequency which is four times the frequency of the carrier of the received NFC signal.

The method may further comprise generating a local signal for use in downconverting the digitised signal.

The local signal may comprise a square wave signal.

Digitising the received signal may comprise attenuating components at odd integer multiples of the carrier of the received NFC signal.

The digitised signal may be downconverted to DC.

The estimate may have a frequency equal to that of the carrier of the received NFC signal.

The local signal may be used in generating the estimate.

BRIEF DESCRIPTION OF THE DRAWINGS

Embodiments of the invention will now be described, strictly by way of example only, with reference to the accompanying drawing, FIG. 1, which is a schematic diagram illustrating part of a receiver architecture for a near field communications (NFC) device.

DESCRIPTION OF THE EMBODIMENTS

FIG. 1 is a block diagram illustrating part of a receiver architecture for a near field communications (NFC) device. It is to be appreciated that the functional blocks shown in FIG. 1 do not necessarily represent components of a physical implementation of a receiver architecture, but instead represent functions that are performed by the receiver architecture. In practice, the receiver architecture may be implemented in many different ways, for example using discrete components or pre-fabricated circuit elements, using one or more appropriately programmed or configured digital signal processors (DSPs), field programmable gate arrays (FPGAs), application specific integrated circuits (ASICs) or general purpose processors.

The receiver is shown generally at 10 in FIG. 1, and includes a variable gain amplifier 12 which receives at its input a data modulated carrier signal received by an antenna of an NFC device incorporating the receiver architecture 10. The output of the variable gain amplifier 12 is connected to a first input of a combiner 14 which has a second input connected to an output of a carrier estimation sub-system 16, whose structure and operation are described in more detail below.

The combiner 14 is operative to combine the modulated received signal with an estimate of the carrier of the received signal so as to suppress at least partially the carrier of the modulated received signal. For example, the combiner 14 may be configured to subtract an in-phase estimate of the carrier from the received signal, or may be configured to add an estimate of the carrier which is phase shifted with respect to the received signal to the received signal to negate at least partially the carrier in the received modulated signal.

The output of the combiner 14 is input to a continuous time bandpass delta-sigma analogue to digital converter (ADC) 18 which has a pass band centred at 13.56 MHz (the frequency of the carrier signal in NFC systems) and which has a sampling frequency of 54.24 MHz, which is four times the frequency of the NFC carrier. The ADC 18 digitises the received modulated signal and outputs a stream of digital samples to a digital sub-system 20.

An amplifier 19 may be provided between the output of the combiner 14 and the input of the ADC 18, or in a first stage of the ADC 18, to amplify the signal output by the combiner 14 to reduce the required dynamic range of the ADC 18.

The digital sub-system 20 includes a downconverter 22 which, in this example, receives the digitised version of the received modulated signal and converts it to in-phase (I) and quadrature (Q) components at DC. Quadrature downconversion is used in the exemplary receiver 10 described here and illustrated in FIG. 1 as it generates I and Q signals that can be used in downstream processing (e.g. demodulation) of the received signal as well as in generating an estimate of the carrier of the received NFC signal. Moreover, the use of quadrature downconversion simplifies the design and implementation of the receiver 10, as will be appreciated from this description. Nevertheless, it will be understood by those skilled that alternative downconversion techniques could be used in place of the quadrature downconverter 22 in the receiver 10.

The downconverter 22 includes a first downconverter mixer 24 that mixes the digital samples output by the ADC 18 with a first downconversion signal generated by a local signal generator 25 to generate a stream of in-phase (I) samples, and a second downconverter mixer 26 that mixes the digital samples output by the ADC with a second downconversion signal generated by the local signal generator 25 (or another local signal generator) to generate a stream of quadrature (Q) samples that are phase shifted by 90 degrees with respect to the in-phase samples.

For downconversion of the digitised version of the received modulated signal from the frequency of the carrier to DC, the first locally generated downconversion signal should be a sinusoid of the form $$u_I = \cos(\omega_c nT),$$

where $\omega_c = 2\pi f_c$, $f_c$ is the frequency of the carrier signal, n is the sample number and T is the time period of the sampled signal, which is equal to $$\frac{1}{f_s},$$

$f_s$ being the sampling frequency.

Thus, the first locally generated downconversion signal $u_I$ can be re-written as $$u_I = \cos\left(\frac{2\pi f_c n}{f_s}\right)$$

As the sampling frequency $f_s$ of the ADC 18 is four times the frequency of the carrier signal $f_c$, the first locally generated downconversion signal $u_I$ is $$u_I = \cos\left(\frac{n\pi}{2}\right)$$

Since the sample number n is always an integer, the value of $u_I$ is always either 1, 0 or −1. For example for the first four samples (i.e. n=0 to n=3) $u_I$ takes the values 1, 0, −1, 0.

For downconversion of the digitised version of the received modulated signal from the frequency of the carrier to DC, the second locally generated downconversion signal should be a sinusoid of the form:

$$u_Q = \sin(\omega_c nT),$$

where $\omega_c = 2\pi f_c$, $f_c$ is the frequency of the carrier signal, n is the sample number and T is the time period of the sampled signal, which is equal to $$\frac{1}{f_s},$$

$f_s$ being the sampling frequency.

Thus, the second locally generated downconversion signal $u_Q$ can be re-written as $$u_Q = \sin\left(\frac{2\pi f_c n}{f_s}\right)$$

As the sampling frequency $f_s$ of the ADC 18 is four times the frequency of the carrier signal $f_c$, the second locally generated downconversion signal $u_Q$ is $$u_Q = \sin\left(\frac{n\pi}{2}\right)$$

Thus, since the sample number n is always an integer, the value of $u_Q$ is always either 0, 1, or −1. For example for the first four samples (i.e. n=0 to n=3) $u_I$ takes the values 0, 1, 0, −1.

The 4:1 ratio of the sampling frequency of the ADC 18 to the carrier frequency of the received NFC signal simplifies the design of the digital sub-system 20, as the local signal generator 25 can simply generate a repeating sequence of the four [1, 0, −1, 0] (i.e. a square wave) for the first locally generated downconversion signal $u_I$, which can be delayed by a simple delay element to generate a repeating sequence of the form [0, 1, 0, −1] for the second locally generated downconversion signal $u_Q$. It is to be understood, however, that the ADC 18 may use different sampling frequencies, although this may necessitate the use of a more complicated local signal generator 25.

The downconverted I and Q signals generated by the downconverter 22 are input to a decimator 28, which decimates the I and Q signals to the Nyquist rate (i.e. twice the bandwidth of the sampled signal) or to any other rate and outputs the decimated I and Q signals to a digital demodulator of the receiver 10 for demodulation to recover the data signal contained within the received signal.

The downconverted I and Q signals are also input to a digital low pass filter 30 which is configured to pass the digitised and downconverted version of the carrier signal but to attenuate strongly the digitised and downconverted version of the data signal that was modulated onto the carrier signal. It will be appreciated that the pass band of the digital low pass filter 30 must be very narrow, since the data signal is typically located at a frequency close to that of the carrier signal.

The output of the digital low pass filter 30 is a digitised and downconverted estimate of the amplitude and phase of the carrier signal present in the received NFC signal, represented as I and Q streams. The I and Q streams are input to respective first and second digital to analogue converters (DACs) 32, 34 of the carrier estimation sub-system 16, which are configured to convert the digital I and Q streams into analogue output signals.

The analogue signals output by the DACs 32, 34 are input to an upconverter 36 having first and second upconverter mixers 38, 40.

The first upconverter mixer 38 receives the signal output by the first DAC 32 (which is an analogue version of the I stream output by the digital bandpass filter 30) and mixes it with a first locally generated upconversion signal, which is at the carrier frequency of the received NFC signal, to generate a version as its output of the signal input to the first upconverter mixer centred on the carrier frequency.

For upconversion of the signal output by the first DAC 32 to the frequency of the carrier of the received NFC signal, the first locally generated upconversion signal should be a sinusoid of the form $$v_I = \cos(\omega_c nT),$$

where $\omega_c = 2\pi f_c$, $f_c$ is the frequency of the carrier signal, n is the sample number and T is the time period of the sampled signal, which is equal to $$\frac{1}{f_s},$$

$f_s$ being the sampling frequency.

Thus, the first locally generated upconversion signal $v_I$ can be re-written as $$v_I = \cos\left(\frac{2\pi f_c n}{f_s}\right)$$

As the sampling frequency $f_s$ of the ADC 18 is four times the frequency of the carrier signal $f_c$, the first locally generated upconversion signal $v_I$ is $$v_I = \cos\left(\frac{n\pi}{2}\right)$$

Since the sample number n is always an integer, the value of $v_I$ is always either 1, 0 or −1. For example for the first four samples (i.e. n=0 to n=3) $v_I$ takes the values 1, 0, −1, 0.

The second upconverter mixer 40 receives the signal output by the second DAC 34 (which is an analogue version of the I stream output by the digital bandpass filter 30) and mixes it with a first locally generated upconversion signal, which is at the carrier frequency of the received NFC signal, to generate a version as its output of the signal input to the first upconverter mixer centred on the carrier frequency.

Similarly, for upconversion of the signal output by the second DAC 34 to the carrier frequency of the received NFC signal, the second locally generated upconversion signal should be a sinusoid of the form $$v_Q = \sin(\omega_c nT),$$

where $\omega_c = 2\pi f_c$, $f_c$ is the frequency of the carrier signal, n is the sample number and T is the time period of the sampled signal, which is equal to $$\frac{1}{f_s},$$

$f_s$ being the sampling frequency.

Thus, the second locally generated upconversion signal $v_Q$ can be re-written as $$v_Q = \sin\left(\frac{2\pi f_c n}{f_s}\right)$$

As the sampling frequency $f_s$ of the ADC 18 is four times the frequency of the carrier signal $f_c$, the second locally generated upconversion signal $v_Q$ is $$v_Q = \cos\left(\frac{n\pi}{2}\right)$$

Since the sample number n is always an integer, the value of $v_Q$ is always either 0, 1, or −1. For example for the first four samples (i.e. n=0 to n=3) $v_Q$ takes the values 0, 1, 0, −1.

As is the case for the downconverter 22, the 4:1 ratio of the sampling frequency of the ADC 18 to the carrier frequency of the received NFC signal simplifies the implementation of the upconverter 36, as a local signal generator can simply generate a repeating sequence of the form [1, 0, −1, 0] (i.e. a square wave) for the first locally generated upconversion signal $v_I$, which can be delayed by a simple delay element to generate a repeating sequence of the form [0, 1, 0, −1] for the second locally generated upconversion signal $v_Q$. In practice, the downconversion signals $u_I$, $u_Q$ generated by the local signal generator 25 may also be used as the upconversion signals $v_I$, $v_Q$. This simplifies the design and implementation of the receiver 10, as only one local signal generator 25 is required. Additionally, timing errors are minimised by the use of a common local signal generator for the upconverter and the downconverter.

The outputs of the upconverter mixers 38, 40 are input to an adder which adds the signals to generate as an output signal an analogue estimate of the carrier signal present in the received NFC signal. This estimate is output to the combiner 14 where it is combined with the received NFC signal to negate or suppress at least partially the carrier signal in the received NFC signal.

It will be appreciated that the first and second upconversion signals $v_I$, $v_Q$ are effectively square waves, and thus the analogue estimate of the carrier of the received NFC signal output by the adder 42 will contain harmonics at odd integer multiples of the carrier frequency $f_c$ of the received NFC signal, i.e. $3f_c$, $5f_c$, $7f_c$ etc, with signal and noise around them. These harmonics are therefore also present in the signal output by the combiner 14.

A property of the continuous time bandpass delta sigma analogue to digital converter 18 used in the example described here and illustrated in FIG. 1 is the presence of zeros in its frequency response at odd integer multiples of $$\frac{f_s}{4},$$

e.g.

$$3\frac{f_s}{4}, 5\frac{f_s}{4}, 7\frac{f_s}{4}$$

etc. As the sampling frequency $f_s$ of the ADC 18 is four times the carrier frequency of the received NFC signal, these zeros occur at odd integer multiples of the carrier frequency of the received NFC signal. The zeros in the frequency response of the ADC 18 coincide in frequency with the harmonics that are present in the signal output by the combiner 14, and thus those harmonics, and the signal and noise around them, are greatly attenuated by the ADC 18 and cannot fold back or alias into the signal band, are not present at any significant amplitude in the output of the ADC 18.

This property also simplifies the specification the low pass filter 30 used to recover the digitised version of the carrier signal, as this filter 30 does not have to filter high frequency signal and noise components which would otherwise be input to the ADC 18 and would fold back or alias into the signal band.

In the example described above and illustrated in FIG. 1 a continuous time delta-sigma bandpass ADC is used to digitise the received NFC signal. This arrangement has advantages, in that the sampling frequency of the delta-sigma ADC 18 can be selected so as to facilitate the implementation of the upconverter 22 and downconverter 36, whilst the implicit anti-aliasing characteristic of the delta-sigma ADC 18 permits the use of simple square waves in the upconverter 36, since harmonics introduced into the signal input to the ADC 18 coincide with notches or zeros in the frequency response of the delta-sigma ADC 18, as described above. However, it is to be understood that alternative ADCs may be used in place of the delta-sigma ADC 18, although this may preclude the use of square waves in the upconverter 22 and downconverter 36, and/or may require additional low-pass filtering of the signal input to the ADC.

The receiver architecture described above suppresses the carrier in a received NFC signal, and thus the proportion of the wanted data signal in the signal output to a subsequent demodulation stage (i.e. the signal to noise ratio) is higher than in known receivers, which means that the dynamic range of the demodulation stage can be reduced in comparison to known systems, which in turn facilitates the design of the demodulation stage. Additionally, this receiver architecture does not require a low phase noise clock.

This receiver architecture is implemented digitally and requires very few analogue components, making it particularly suitable for implementation in an integrated circuit (IC), and the silicon area occupied by such an implementation is small. Additionally, the power dissipation of such an IC implementation is within acceptable limits.

The invention claimed is:

1. A near field communications (NFC) receiver, the receiver comprising:
    an analogue to digital converter (ADC) for digitising a received NFC signal comprising a carrier modulated with an information signal;
    a downconverter for downconverting the digitised signal;
    a filter for filtering the downconverted signal to recover a digitised and downconverted version of the carrier;
    a digital to analogue converter (DAC) for converting the digitised and downconverted version of the carrier into an analogue signal;
    an upconverter for generating, from the analogue signal generated by the DAC, an estimate of the carrier of the received NFC signal; and
    a combiner for combining the estimate with the received NFC signal.

2. A NFC receiver according to claim 1 wherein the ADC comprises a delta-sigma ADC.

3. A NFC receiver according to claim 2 wherein the ADC is configured to have a sampling frequency which is four times the frequency of the carrier of the received NFC signal.

4. A NFC receiver according to claim 1 further comprising a signal generator for generating a local signal for use in the downconverter.

5. A NFC receiver according to claim 4 wherein the signal generator is configured to generate a square wave signal.

6. A NFC receiver according to claim 1 wherein the ADC is configured to have zeros in its frequency response at odd integer multiples of the carrier of the received NFC signal.

7. A NFC receiver according to claim 1 wherein the downconverter is configured to downconvert the digitised signal to DC.

8. A NFC receiver according to claim 7 wherein the upconverter is configured to generate an estimate having a frequency equal to that of the carrier of the received NFC signal.

9. A NFC receiver according to claim 4 wherein the upconverter is configured to use the signal generated by the local signal generator.

10. A method of suppressing a carrier in a near field communications (NFC) signal, the method comprising:
receiving an NFC signal comprising a carrier modulated with an information signal;
digitising the received NFC signal;
downconverting the digitised signal;
filtering the downconverted signal to recover a digitised and downconverted version of the carrier;
converting the digitised and downconverted version of the carrier into an analogue signal;
generating, from the analogue signal generated by the DAC, an estimate of the carrier of the received NFC signal; and
combining the estimate with the received NFC signal.

11. A method according to claim 10 wherein digitising the received signal is performed by a delta-sigma ADC.

12. A method according to claim 11 wherein the ADC is configured to have a sampling frequency which is four times the frequency of the carrier of the received NFC signal.

13. A method according to claim 10 further comprising generating a local signal for use in downconverting the digitised signal.

14. A method according to claim 13 wherein the local signal comprises a square wave signal.

15. A method according to claim 10 wherein digitising the received signal comprises attenuating components at odd integer multiples of the carrier of the received NFC signal.

16. A method according to claim 10 wherein the digitised signal is downconverted to DC.

17. A method according to claim 16 wherein the estimate has a frequency equal to that of the carrier of the received NFC signal.

18. A method according to claim 13 wherein the local signal is used in generating the estimate.

* * * * *

UNITED STATES PATENT AND TRADEMARK OFFICE
CERTIFICATE OF CORRECTION

| | | |
|---|---|---|
| PATENT NO. | : 8,606,212 B2 | Page 1 of 1 |
| APPLICATION NO. | : 13/523640 | |
| DATED | : December 10, 2013 | |
| INVENTOR(S) | : Sheikholeslami | |

It is certified that error appears in the above-identified patent and that said Letters Patent is hereby corrected as shown below:

In the Specification

In Column 5, Line 36, delete "four" and insert -- form --, therefor.

Signed and Sealed this
Second Day of September, 2014

Michelle K. Lee
*Deputy Director of the United States Patent and Trademark Office*